H. C. HUBBELL.
PROCESS OF MAKING STORAGE BATTERY ELECTRODES.
APPLICATION FILED JUNE 8, 1911.

1,087,237.                    Patented Feb. 17, 1914.

WITNESSES:                         INVENTOR.
                                   Harry C. Hubbell
                                   BY
                                   ATTORNEY.

UNITED STATES PATENT OFFICE.

HARRY CROSS HUBBELL, OF NEWARK, NEW JERSEY.

PROCESS OF MAKING STORAGE-BATTERY ELECTRODES.

1,087,237.

Specification of Letters Patent. Patented Feb. 17, 1914.

Application filed June 8, 1911. Serial No. 631,900.

*To all whom it may concern:*

Be it known that I, HARRY CROSS HUBBELL, a citizen of the United States, residing at Newark, in the county of Essex and State of New Jersey, have invented certain new and useful Improvements in Processes of Making Storage-Battery Electrodes, of which the following is a specification.

My present invention relates to an improved storage battery electrode being specifically a plate of special construction, consisting of nickel strips supporting cobalt active material.

Figure 1:
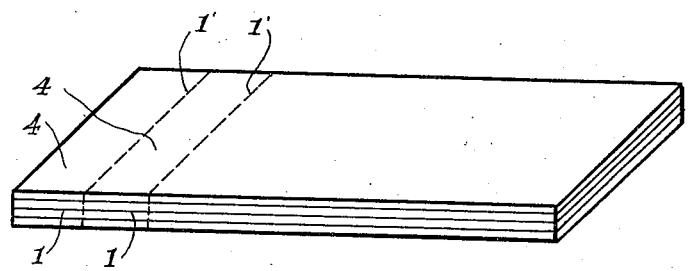
Figure 2:
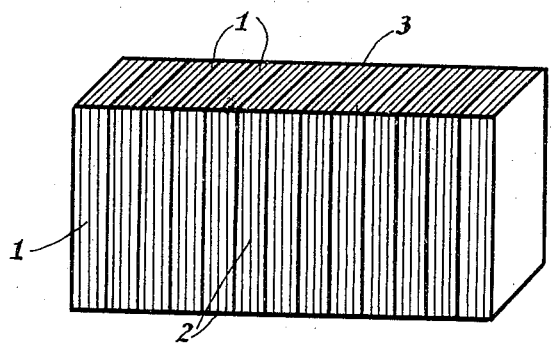

In the drawings, Figure 1 shows a plate consisting of alternate layers of different metals; and Fig. 2 shows this plate after it has been cut up into bars 1, as along the lines 1' of Fig. 1, and after these bars have been rearranged to form a storage battery plate wherein the layers are disposed edgewise to the faces 2 and 3 of the plate, that is, in Fig. 2 the surfaces 4—4 are placed in abutment.

I will now describe my improved electrode-plate and the process for its manufacture, reserving it to the claims to point out the novel features and to define the scope of the invention, it being understood that the claims will be interpreted to have the due range of equivalents to which they may be entitled in view of the art.

I start with a sheet made up in any preferred manner of alternate layers of copper, cobalt and nickel, the succession of the layers being copper, cobalt, nickel, cobalt, copper, cobalt, nickel, cobalt, copper, etc. The individual layers are preferably of film-like thickness. An obvious way of making the sheet will be by successive electro-depositions of the metals until the desired aggregate thickness for the sheet is reached. I then cut up this sheet into bars which I arrange side by side in the shape of the finished electrode-plate, with the layers of the bars directed edgewise to the faces of said plate. Each set of ends of the bars are then integrally united, preferably by fusing them with an oxyhydrogen or acetylene flame so that each set of ends are in perfect electrical connection along the side edges of the plate. Another method of uniting the bars is by binding them together in a surrounding frame of a suitable metal, such as nickel. Here again, however, the ends of the bars are preferably fused to said frame to insure perfect electrical connection. A convenient size for the electrode-plate is about one inch by five inches by three-sixteenths of an inch thick.

The mechanical features of obtaining the so-called bars from the sheet and their assembling into a plate with their layers disposed edgewise to the faces are the same as illustrated in the drawings and in my copending United States application, Serial No. 631,271 filed June 5, 1913. Next I dissolve out the copper layers and prefer to do this by making the plate an anode in an electrolyte made up of sodium acetate and ammonium acetate to which ammonia is continually added, so that there is always free ammonia. The strength of the electrolyte may vary but I have found that a concentration of 5 to 10 B. degrees is suitable with a use of equal proportions of the sodium acetate and ammonia acetate ingredients. The current density should be kept low enough so that the cobalt and nickel are not attacked. The result is that the copper layers are dissolved out of the plate and this operation is completed when the electrolyte ceases to turn blue in a half hour or so after the addition of ammonia. The plate is now washed with hot water to get rid of salts. The cobalt layers are then oxidized to convert them into cobalt active material, which may conveniently be described as consisting of cobalt oxygen compounds whether including oxids or hydroxids or combinations of these.

The conversion of the cobalt, I prefer to accomplish by using the plate as an anode in a dilute solution of phenol containing a percentage of alkaline phenolate. In this way I oxidize the cobalt layers which it will be noted cover both sides of the nickel layers. This is effected with relative ease because the cobalt is so much easier to oxidize than the nickel, with the result that the formed plate consists of cobalt active material supported by nickel conducting strips.

Instead of oxidizing the cobalt in the described electrolyte I may instead use a dilute alkaline solution of sodium chlorid, sulfate or nitrate, as well as possibly other electrolytes. After washing the plate it is preferably put into the usual containing pocket to finish the electrode.

Instead of using copper layers as above, I may substitute therefor some other material having the relative solubility of copper, such as cadmium, with appropriate modifications in the process for subsequently removing the cadmium.

The finished electrode-plate in its preferred form consists of numerous thin nickel strips of film-like thinness arranged in close face to face parallelism disposed edgewise to the superficies of the plate and supporting the intermediate films of active material, consisting of cobalt oxygen compounds.

What I claim is:

1. The process of making storage battery electrodes which comprises uniting into a plate alternate layers of nickel, cobalt, and a metal having copper-like solubility, the succession of the layers being the copper-like metal, cobalt, nickel, cobalt, and the copper-like metal, said layers being disposed edgewise to the faces of the plate; dissolving out the copper layers; and oxidizing the cobalt layers.

2. The process of making storage battery electrodes which comprises uniting into a plate alternate layers of nickel, cobalt, and a metal having copper-like solubility, the succession of the layers being the copper-like metal, cobalt, nickel, cobalt, and the copper-like metal, said layers being disposed edgewise to the faces of the plate; dissolving out the copper layers by electrolytic oxidation in the presence of free ammonia; electrolytically oxidizing the cobalt layers.

3. The process of making storage battery electrodes which comprises uniting into a plate alternate layers of nickel, cobalt, and a metal having copper-like solubility, the succession of the layers being the copper-like metal, cobalt, nickel, cobalt, and the copper-like metal, said layers being disposed edgewise to the faces of the plate; dissolving out the copper layers by using the plate as an anode in a sodium acetate and ammonium acetate solution containing free ammonia at a current density sufficiently low so as not to attack the cobalt; and oxidizing the cobalt.

4. The process of making storage battery electrodes which comprises uniting into a plate alternate layers of nickel, cobalt, and a metal having copper-like solubility, the succession of the layers being the copper-like metal, cobalt, nickel, cobalt, and the copper-like metal, said layers being disposed edgewise to the faces of the plate; dissolving out the copper layers by using the plate as an anode in a sodium acetate and ammonium acetate solution containing free ammonia at a current density sufficiently low so as not to attack the cobalt; and oxidizing the cobalt by using the plate as an anode in a dilute solution of phenol and fixed alkali using a low density "forming" current.

In testimony whereof I have affixed my signature in presence of two witnesses.

HARRY CROSS HUBBELL.

Witnesses:
E. W. SCHERR, Jr.,
W. H. LEWIS.

---

Copies of this patent may be obtained for five cents each, by addressing the "Commissioner of Patents, Washington, D. C."